United States Patent
Grützner (10) Patent No.: US 11,885,178 B2
(45) Date of Patent: Jan. 30, 2024

(54) SCREEN DEVICE

(71) Applicant: Auto-Motion Shade Inc., Scarborough (CA)

(72) Inventor: Hans Grützner, Kehrsatz (CH)

(73) Assignee: AUTO-MOTION SHADE INC.

( * ) Notice: Subject to any disclaimer, the term of this patent is extended or adjusted under 35 U.S.C. 154(b) by 0 days.

(21) Appl. No.: 17/561,155

(22) Filed: Dec. 23, 2021

(65) Prior Publication Data

US 2022/0220802 A1 Jul. 14, 2022

(30) Foreign Application Priority Data

Jan. 14, 2021 (EP) .................................. 21151598

(51) Int. Cl.
| | |
|---|---|
| *E06B 9/322* | (2006.01) |
| *E06B 9/262* | (2006.01) |
| *E06B 9/327* | (2006.01) |

(52) U.S. Cl.
CPC .............. *E06B 9/322* (2013.01); *E06B 9/262* (2013.01); *E06B 9/327* (2013.01); *E06B 2009/2625* (2013.01)

(58) Field of Classification Search
CPC .......... E06B 9/322; E06B 9/262; E06B 9/327; E06B 2009/2625; E06B 2009/2627; E06B 9/264
See application file for complete search history.

(56) References Cited

U.S. PATENT DOCUMENTS

| | | | | |
|---|---|---|---|---|
| 4,473,101 A | | 9/1984 | Langeler | ...................... 160/84 R |
| 4,557,309 A | * | 12/1985 | Judkins | ..................... E06B 9/32 |
| | | | | 160/279 |
| 4,825,929 A | * | 5/1989 | Haines | .................... E06B 9/327 |
| | | | | 160/279 |

(Continued)

FOREIGN PATENT DOCUMENTS

| | | |
|---|---|---|
| DE | 20 2013 012 592 U1 | 10/2017 |
| EP | 1 526 245 A1 | 4/2005 |
| EP | 2231986 B1 | 5/2015 |

OTHER PUBLICATIONS

Search Report dated Jun. 24, 2021 in corresponding European Patent Application No. 21 15 1598.

*Primary Examiner* — Daniel P Cahn
*Assistant Examiner* — John W Hanes, Jr.
(74) *Attorney, Agent, or Firm* — OSTROLENK FABER LLP (57) ABSTRACT

A screen device intended for a window or a door in a building or vehicle. The device includes a first elongated frame part having two ends; a further frame part and a third one, respectively, being arranged at each end of the first frame part at right angles to the first frame part and connected to a first one of its two ends. Two crossbars are arranged in parallel to the fixedly arranged first frame part and movable independently of each other along the two further frame parts. A pleated screen element is arranged between the first crossbar and the second crossbar, and the crossbars are guided by guide cords. At least one of the crossbars is formed by two profiles that are arranged in parallel to each other and leave a space between them in which a strip provided with holes for respective ones of the guide cords is received.

10 Claims, 5 Drawing Sheets

(56) References Cited

U.S. PATENT DOCUMENTS

| | | | | |
|---|---|---|---|---|
| 4,850,414 A | * | 7/1989 | Lessard | E06B 9/388 |
| | | | | 160/279 |
| 4,998,576 A | * | 3/1991 | Moreno | E06B 9/262 |
| | | | | 160/90 |
| 5,351,737 A | * | 10/1994 | Hoshiyama | E06B 9/262 |
| | | | | 160/84.03 |
| 7,216,687 B2 | | 5/2007 | Franssen | 160/84.06 |
| 7,891,398 B2 | * | 2/2011 | Chino | E06B 9/24 |
| | | | | 160/84.06 |
| 2002/0129906 A1 | | 9/2002 | Lai | 160/89 |

* cited by examiner

SCREEN DEVICE

CROSS-REFERENCE TO A RELATED APPLICATION

The present application claims priority to European Patent Application No. 21 151 598.6, filed Jan. 14, 2021, the content of which is incorporated by reference herein.

TECHNICAL FIELD

The invention relates to a screen device for an opening, e.g. a window or a door in a building or vehicle, comprising a first elongated frame part having two ends; a second and a third frame part, respectively, that are oriented at right angles to said first frame part, being connected at each end of said first frame part to a first one of its two ends; a first crossbar and a second crossbar which are arranged in parallel to said first, fixedly arranged frame part and movable independently of each other along said two further frame parts; and a pleated screen element that is arranged between said first crossbar and said second crossbar, the crossbars being guided by guide cords.

BACKGROUND OF THE INVENTION

Screen devices having a frame and a cord-guided, movable crossbar have been known in the art for some time, e.g. from the reference U.S. Pat. No. 4,473,101. In particular, they serve for visual, glare, or insect protection on openings such as e.g. windows in buildings but also in vehicles like campers. The described guide cords substantially have three functions, namely first to ensure the parallel guidance of the crossbar and to prevent its canting, second to provide a self-locking effect of the crossbar so that it is not displaced by its own weight or by shocks, and third to support a screen element arranged between an upper frame part and the crossbar so that it is not deformed or damaged by lateral forces, e.g. as a result of air draught or incorrect handling or operation, respectively.

From the reference US2005101456A1, a screen device having two movable crossbars is known between which a screen element is arranged. In particular, this device offers the advantage that both the upper and the lower end of the screen device are movable and thus a desired vertical area of an opening can be screened. Furthermore, the screen device according to US2005101456A1 offers the advantage that three fixed frame parts are sufficient, i.e. that a closed frame is not required, whereby it can be used in tight spaces, e.g. in a camper.

Particularly in the last-mentioned screen devices, at least part of the guide cords are deflected in at least one of the crossbars in two points and guided in parallel to the crossbar between these two points. At least part of these deflection points is formed by holes in the corresponding crossbar. If the crossbars are made in the form of C or hollow profiles, it is very difficult to achieve a clean deburring of the edges of these holes and to round them off, particularly on the inside of the profiles. Sharp edges not only hinder the movement of the crossbars but may also cause damages to the guide cords. Moreover, in the case of a C profile, the guide cords are visible between the flanges of the C profile and may interfere during manual handling of the crossbar.

On the background of this prior art, it is an object of the invention to simplify the manufacture of the screen device. Another object is to increase the operation reliability of the screen device and to prevent damages to the guide cords as far as possible.

SUMMARY OF THE INVENTION

According to the invention, these objects are achieved by a screen device wherein at least one of said crossbars is formed by two profiles that are arranged in parallel to each other and leave a space between them in which a strip provided with holes for respective ones of said guide cords is received.

Due to the fact that at least one of the crossbars is formed by two profiles that are arranged in parallel to each other, the guide cords running inside the crossbar are not visible from the outside. The bar can be provided with holes for a respective guide cord prior to the assembly of the screen device. At this point, the bar is still freely accessible from both sides so that deburring and rounding off the edges of the holes is easily possible.

BRIEF DESCRIPTION OF THE DRAWINGS

An exemplary embodiment of the invention will be explained hereinafter with reference to the attached drawings showing.

DESCRIPTION OF PREFERRED EMBODIMENTS

Figure 1:
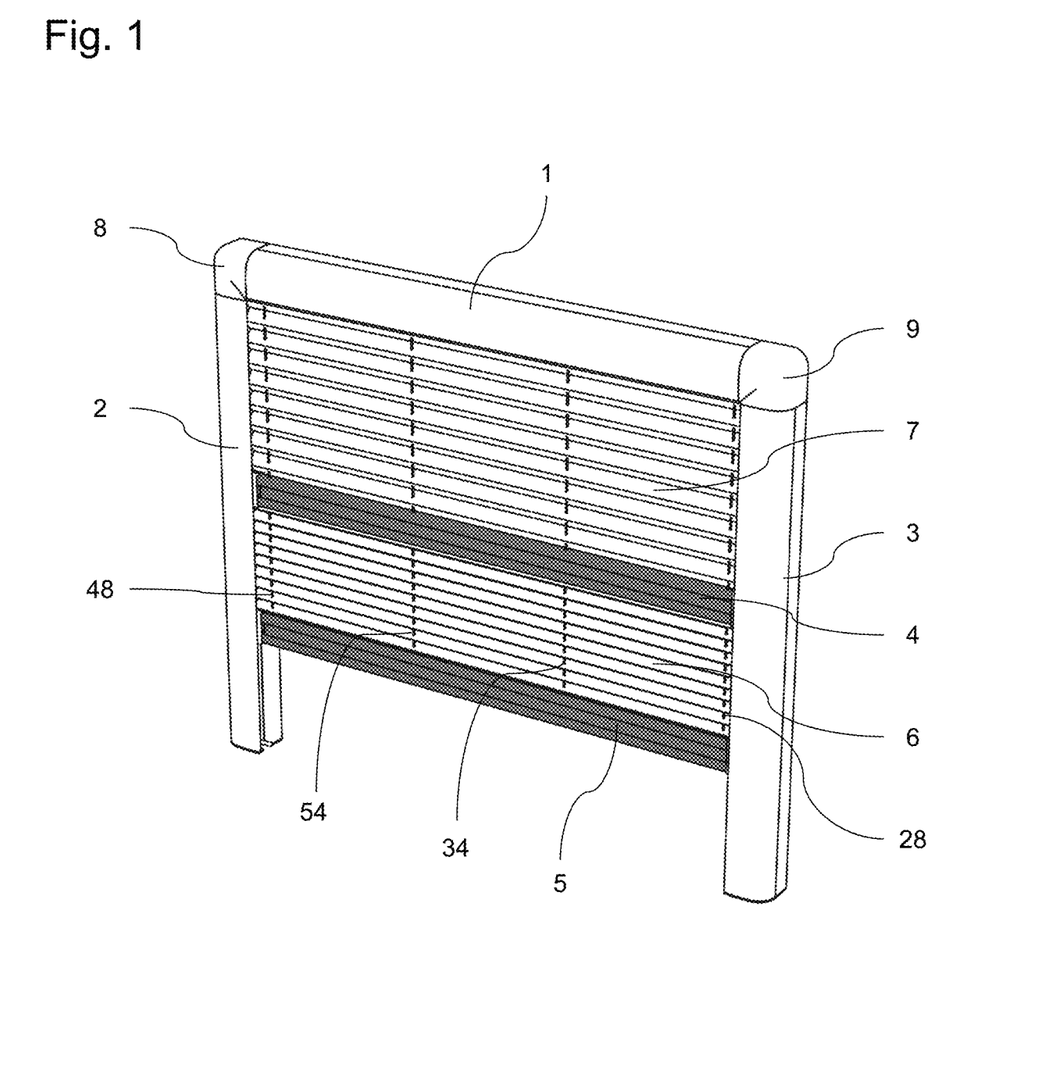
FIG. 1 a perspective view of a screen device.

The screen device illustrated in FIG. 1 comprises a first frame part 1 whose two ends are connected to a second frame part 2 and a third frame part 3 by means of corner pieces 8, 9. The screen device illustrated here as an example has only three frame parts, which can be advantageous in the case of limited space, e.g. in a caravan or a camper, and particularly also for doors. However, the invention is not limited to such open frames having three frame parts but is also applicable to closed frames having four frame parts.

A first crossbar 4 and a second crossbar 5 are arranged between the second and third frame parts 2, 3 in parallel to first frame part 1 and movable along the second and third frame parts 2, 3 independently of each other. Between first crossbar 4 and second crossbar 5, a pleated screen element 6 is arranged and connected to both crossbars 4, 5. Screen element 6 can be made of a textile material and may be partly or entirely opaque. By displacing crossbars 4, 5 together or against each other it is possible to adapt an area e.g. of a window to the requirements of sight or glare protection in its size and position. Between first frame part 1 and first crossbar 4, another screen element 7 is arranged and connected to first frame part 1 and first crossbar 4. This additional screen element 7 may e.g. have a mesh structure and serve as an insect protection screen. The arrangement of guide cords 28, 34, 48, and 54 visible in this figure will be explained in more detail below in connection with FIGS. 5 to 7.

Figures 2, 3, 4:
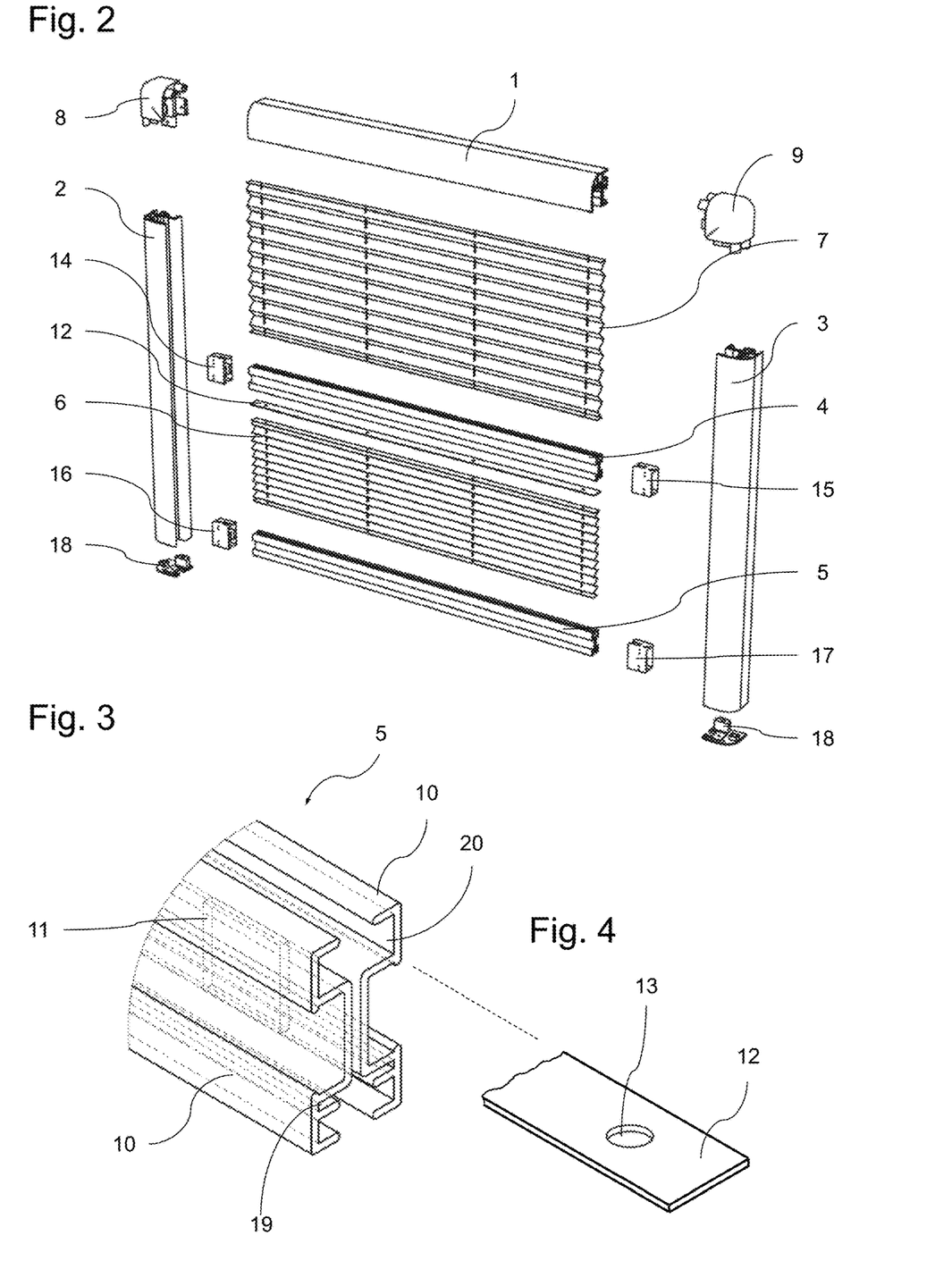
FIG. 2 an exploded view of the screen device of FIG. 1.
FIGS. 3 and 4 a detail of FIG. 2 on an enlarged scale relative to FIG. 2.

FIG. 2 shows the device of FIG. 1 in an exploded view. Identical parts are designated by the same reference numerals and are not all repeated here. In this figure, the guide cords are only symbolically indicated and not represented on their entire course. It appears that first crossbar 4 is provided with two end pieces 14, 15 and second crossbar 5 with two end pieces 16, 17. On one hand, these end pieces 14 to 17 serve for guiding crossbars 4, 5 in the respective frame parts 2, 3, and on the other hand, for deflecting guide cords, as will be described further below. At their free ends, frame parts 2, 3 are provided with end portions 18 in which guide cords are anchored. It is understood that in a closed frame having four frame parts, end portions 18 will be replaced by corner pieces similar to 8, 9.

FIG. 3 shows crossbar 5, which is composed of two identical profiles 10, on an enlarged scale. Spacers 11 provide a space between profiles 10 through which sections of the guide cords are running. With a corresponding design of end pieces 16, 17, spacers 11 may be omitted. Profiles 10 are provided with longitudinal grooves 19 that allow a non-represented brush strip to be inserted into crossbar 5 which serves as a seal against the ingress of insects when crossbar 5 is in its lowermost position. Crossbar 4 is similarly designed while profiles 10 are preferably arranged such that longitudinal grooves 19 are at the top and not provided with a brush strip, of course.

FIG. 4 shows a strip 12 (see also FIG. 2) having holes 13, which is received in a space 20 formed by profiles 10. Through each hole 13, one of the guide cords is guided and in some cases deflected (cf. FIGS. 5 to 7). This design using a strip 12 substantially simplifies the manufacture of the screen device since prior to the insertion of strip 12 into the mentioned space 20, holes 13 are easily accessible and can be carefully deburred and rounded off.

Figure 5:
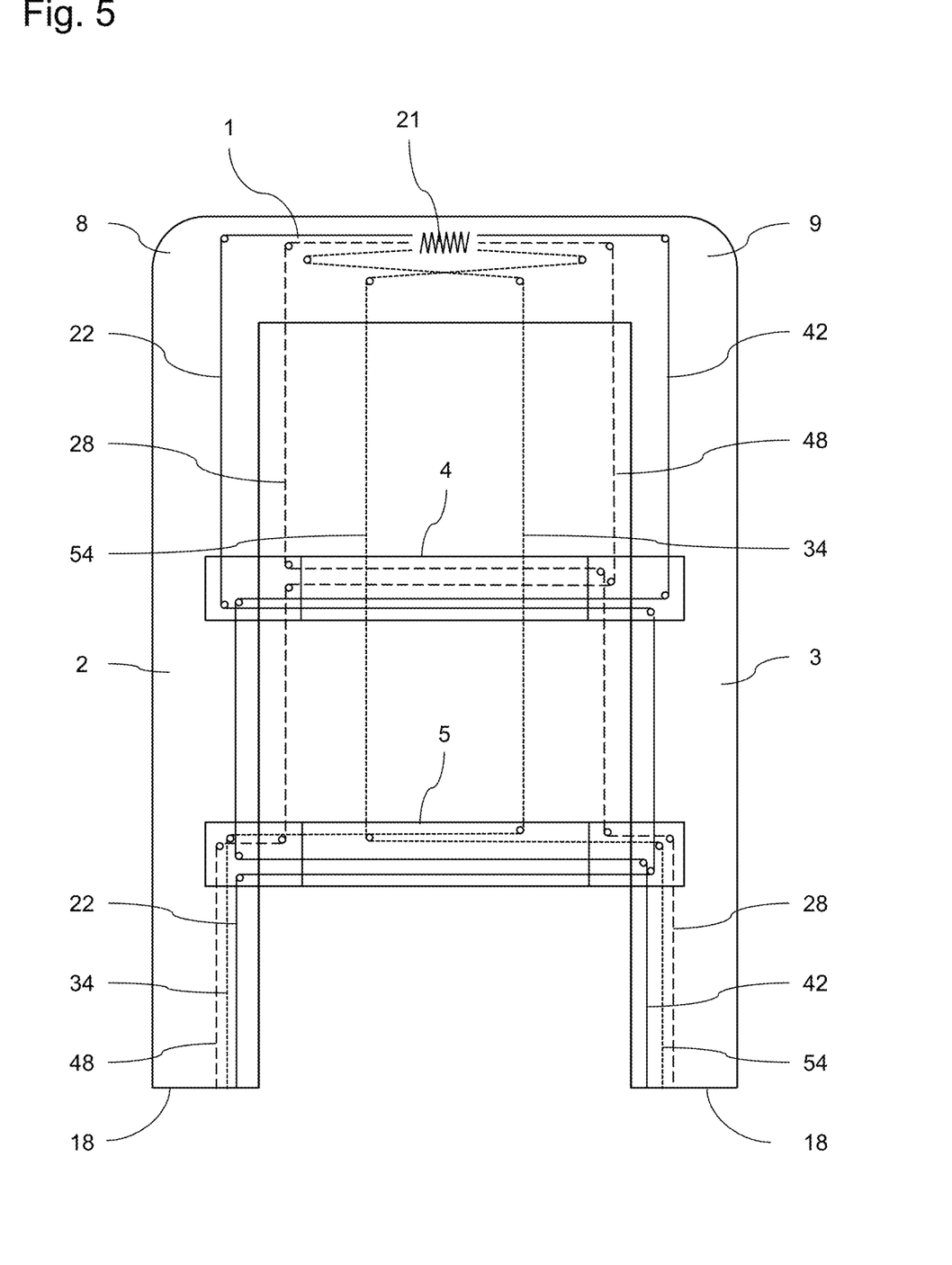
FIG. 5 a schematic illustration of the course of the guide cords.

In a schematic view, on one hand, FIG. 5 shows the previously described components, i.e. the first frame part 1, the second and third frame parts 2 resp. 3, the first crossbars 4 resp. 5, corner pieces 8 and 9, and end portions 18. In the middle of first frame part 1, a tension spring 21 is arranged to the two ends of which a total of six guide cords are fastened. As indicated in the figures, tension spring 21 may be a spiral coiled spring or an elastomeric element, e.g. a rubber band. On the left side of tension spring 21 in the figure, guide cords 22, 28, and 34 are fastened, and on the right side, guide cords 42, 48, and 54. As can be seen, the arrangement of the guide cords is symmetrical on both sides of tension spring 21.

Figure 6:
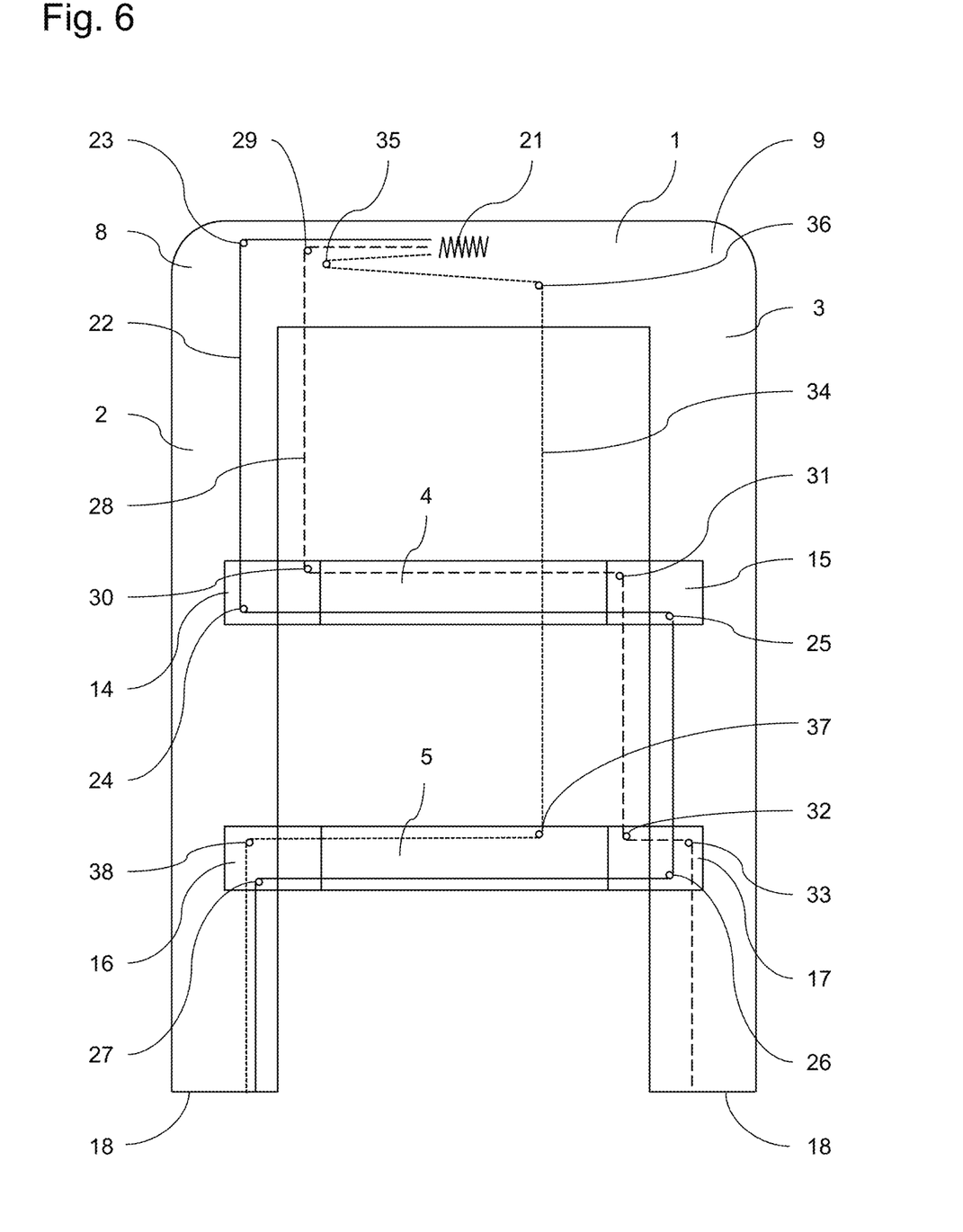
FIGS. 6 and 7 the course of the guide cords according to FIG. 5 separately for each side for better clarity.
Figure 7:
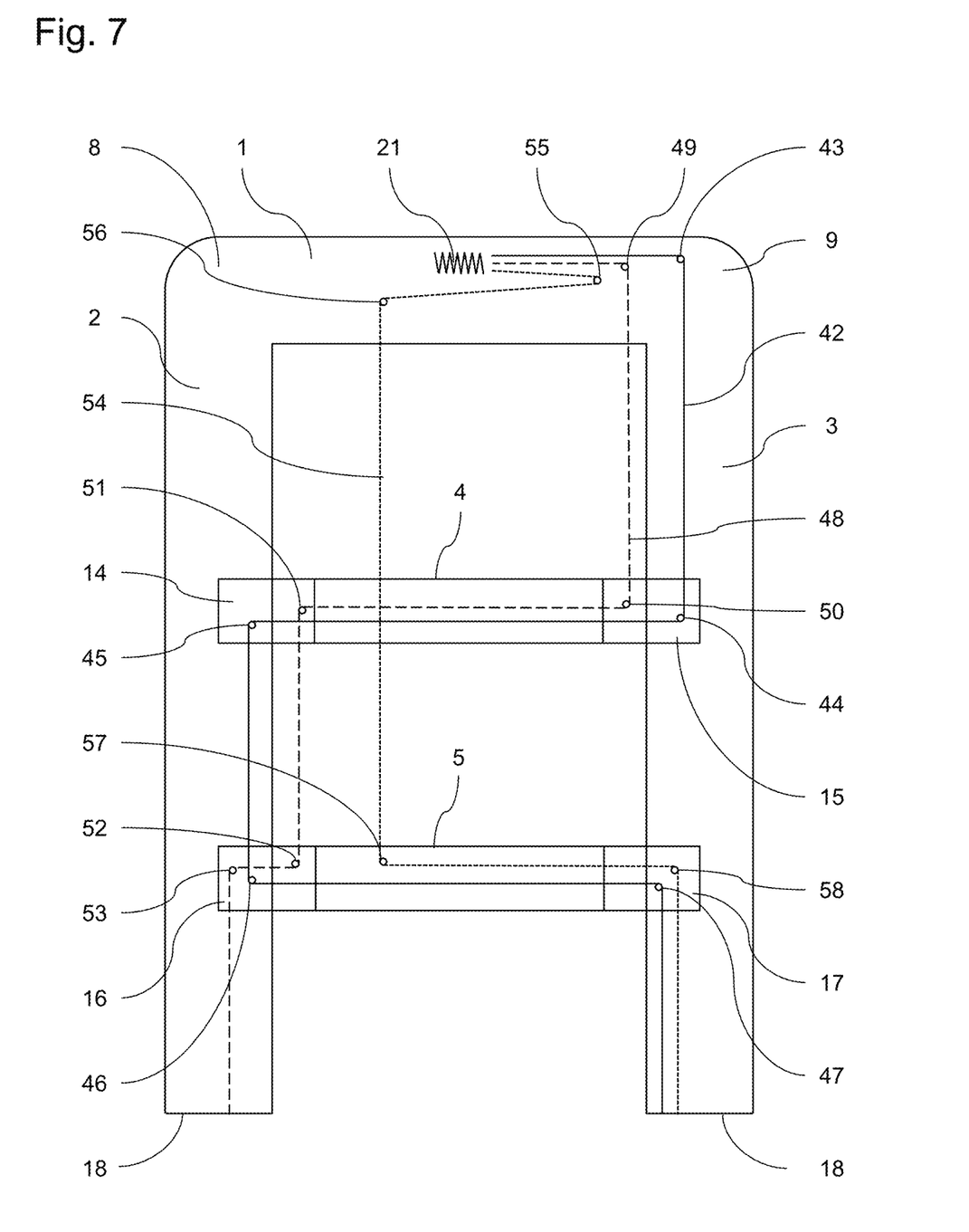

For more clarity, the detailed arrangement of the guide cords and their deflection points are shown separately in FIGS. 6 and 7. FIG. 6 shows the guide cords 22, 28, and 34 which connect to tension spring 21 on the left side. In this figure, the associated deflection points are also provided with reference numerals. Correspondingly, FIG. 7 shows the guide cords 42, 48, and 54 which depart from tension spring on the right side and their associated deflection points. As mentioned, the arrangements according to FIGS. 6 and 7 are symmetrical while each reference numeral in FIG. 7 that designates a guide cord or a deflection point corresponds to the one in Figure plus 20.

In FIG. 6, leading from tension spring 21 to the left, a first guide cord 22 is represented by a solid line. After a deflection point 23 in corner piece 8, first guide cord 22 runs downwards in frame part 2 to a deflection point 24 in end piece 14 of first crossbar 4. From there, first guide cord 22 runs to the right through first crossbar 4 to a deflection point 25 in end piece 15 of first crossbar 4, from where it runs downwards in frame part 3 to a deflection point 26 in the end piece of second crossbar 5. From there, first guide cord 22 runs through second crossbar 5 to a deflection point 27 in end piece 16 of second crossbar 5, from where it runs through frame part 2 to end portion 18, where it is fastened.

A second guide cord 28 is represented by a broken line and also runs from tension spring 21 to the left to a deflection point 29 arranged in first frame part 1 and downwards through openings provided in the folded sections of screen element 7 to a deflection point 30 in end piece 14 of first crossbar 4. From there, second guide cord 28 is guided through first crossbar 4 and in parallel thereto to a deflection point 31 arranged in end piece 15 of first crossbar 4, and then runs downwards through openings provided in the folded sections of screen element 6 to a deflection point 32 in end piece 17 of crossbar 5. A deflection point 33 adjacent to deflection point 32, also in end piece 17, finally directs guide cord 28 to end portion 18 in frame part 3, where it is fastened.

A third guide cord 34 is illustrated by a dotted line and is deflected on the left side of tension spring 21 by a deflection point 35 to the right and guided through first frame part 1 in the opposite direction to a deflection point 36, from where it runs downwards through openings provided in the folded sections of screen element 7 through one of the holes 13 provided in strip 12 in first crossbar 4 without being deflected, and through openings provided in the folded sections of screen element 6 to a deflection point 37 arranged in crossbar 5. Deflection point 37 is formed by a hole 13 in strip 12 mentioned in connection with FIGS. 2 to 4. From there, third guide cord 34 runs through second crossbar 5 and in parallel thereto to a deflection point 38 arranged in end piece 16 and from there in frame part 2 to end portion 18, where it is fastened.

As mentioned, the arrangement of the guide cords and deflection points shown in FIG. 7 is the mirror image of that of FIG. 5. Reference numerals 42 to 58 in FIG. 7 analogously correspond to reference numerals 22 to 38 in FIG. 6.

| List of Reference Numerals | |
|---|---|
| 1 | first frame part |
| 2 | further frame part |
| 3 | further frame part |
| 4 | first crossbar |
| 5 | second crossbar |
| 6 | screen element |
| 7 | further screen element |
| 8 | corner piece |
| 9 | corner piece |
| 10 | profile |
| 11 | spacer |
| 12 | strip |
| 13 | hole |
| 14 | end piece |
| 15 | end piece |
| 16 | end piece |
| 17 | end piece |
| 18 | end portion |
| 19 | longitudinal grooves |
| 20 | space |
| 21 | tension spring |
| 22 | first guide cord |
| 23 | deflection point 22 |
| 24 | deflection point 22 |
| 25 | deflection point 22 |
| 26 | deflection point 22 |
| 27 | deflection point 22 |
| 28 | second guide cord |
| 29 | deflection point 28 |
| 30 | deflection point 28 |
| 31 | deflection point 28 |
| 32 | deflection point 28 |
| 33 | deflection point 28 |
| 34 | third guide cord |

-continued

| List of Reference Numerals | |
|---|---|
| 35 | deflection point 34 |
| 36 | deflection point 34 |
| 37 | deflection point 34 |
| 38 | deflection point 34 |
| 39 | |
| 40 | |
| 41 | |
| 42 | fourth guide cord |
| 43 | deflection point 42 |
| 44 | deflection point 42 |
| 45 | deflection point 42 |
| 46 | deflection point 42 |
| 47 | deflection point 42 |
| 48 | fifth guide cord |
| 49 | deflection point 48 |
| 50 | deflection point 48 |
| 51 | deflection point 48 |
| 52 | deflection point 48 |
| 53 | deflection point 48 |
| 54 | sixth guide cord |
| 55 | deflection point 54 |
| 56 | deflection point 54 |
| 57 | deflection point 54 |
| 58 | deflection point 54 |
| 59 | |
| 60 | |

The invention claimed is:

1. A screen device for an opening in a window or a door in a building or vehicle, comprising:
 a first elongated frame part having two ends;
 a second frame part and a third frame part, respectively, that are oriented at right angles to the first frame part, being connected at each end of said first frame part to A first one of two ends of each of said second frame part and said third frame part;
 a first crossbar and a second crossbar which are arranged in parallel to said first elongated frame part and movable independently of each other along said second frame part and said third frame part; and
 a pleated screen element that is arranged between said first crossbar and said second crossbar, said crossbars being guided by guide cords,
 wherein at least one of said crossbars is formed by two discrete profiles which are connected to each other at free ends thereof and leave between said two discrete profiles a space forming a continuous opening oriented in a plane defined by the second frame part and the third frame part and in which said space a strip provided with holes for respective ones of said guide cords is received,
 wherein the continuous opening separates the two discrete profiles such that the two discrete profiles do not directly contact each other between their respective ends,
 wherein the crossbars are arranged to move slidably in the second and third frame parts, and
 wherein the second and the third frame parts are fixedly attached to the respective ends of the first frame part to extend at a ninety degree angle.

2. The screen device of claim 1, wherein the two profiles of said at least one of said crossbars are identical in design and arranged in a mirror-inverted manner.

3. The screen device of claim 1, wherein between said first frame part and said first crossbar, an additional pleated screen element is arranged.

4. The screen device of claim 1, wherein each of said guide cords runs from a tensioning device that is fixedly arranged in said first frame part through said crossbars to one of said ends of said second or third frame part on a side opposite said first frame part.

5. The screen device of claim 4, wherein more than four guide cords are provided, of which at least two run through folded areas of said pleated screen element.

6. The screen device of claim 5, wherein four guide cords are deflected in said first crossbar and two guide cords run through said first crossbar without being deflected.

7. The screen device of claim 5, wherein six guide cords are provided, of which at least four run through folded areas of said pleated screen element.

8. The screen device of claim 7, wherein said tensioning device has two ends and three guide cords are connected to each end.

9. The screen device of claim 7, wherein three respective guide cords are fastened to the second end of said second and third frame parts.

10. The screen device of claim 7, wherein all six guide cords are deflected in said second crossbar.

* * * * *

UNITED STATES PATENT AND TRADEMARK OFFICE
CERTIFICATE OF CORRECTION

| | | |
|---|---|---|
| PATENT NO. | : 11,885,178 B2 | Page 1 of 1 |
| APPLICATION NO. | : 17/561155 | |
| DATED | : January 30, 2024 | |
| INVENTOR(S) | : Hans Grützner | |

It is certified that error appears in the above-identified patent and that said Letters Patent is hereby corrected as shown below:

In the Claims

Claim 1 at Column 5, Line 34 the phrase "A first one" should be -- a first one --

Signed and Sealed this
Thirtieth Day of April, 2024

Katherine Kelly Vidal
*Director of the United States Patent and Trademark Office*